(12) United States Patent
Lin et al.

(10) Patent No.: US 6,714,721 B2
(45) Date of Patent: Mar. 30, 2004

(54) CHANGING A PLAYBACK SPEED FOR VIDEO PRESENTATION RECORDED IN A NON-PROGRESSIVE FRAME STRUCTURE FORMAT

(75) Inventors: Shu Lin, Indianapolis, IN (US); Jianlei James Xie, Carmel, IN (US); Mark Alan Schultz, Carmel, IN (US)

(73) Assignee: Thomson Licensing, Boulogne (FR)

( * ) Notice: Subject to any disclaimer, the term of this patent is extended or adjusted under 35 U.S.C. 154(b) by 191 days.

(21) Appl. No.: 09/883,547

(22) Filed: Jun. 18, 2001

(65) Prior Publication Data

US 2002/0191958 A1 Dec. 19, 2002

(51) Int. Cl.⁷ .................................................. H04N 5/93
(52) U.S. Cl. ............................ 386/52; 386/68; 386/110
(58) Field of Search ..................... 386/68, 70, 125–126, 386/109, 111, 110, 92, 52; H04N 5/93

(56) References Cited

U.S. PATENT DOCUMENTS 5,589,993 A * 12/1996 Naimpally .................. 386/109
5,867,625 A * 2/1999 McLaren ..................... 386/68
6,292,621 B1 * 9/2001 Tanaka et al. ................ 386/68

* cited by examiner

Primary Examiner—Vincent Boccio
(74) Attorney, Agent, or Firm—Joseph S. Stipoli; Harvey D. Fried; Christine Johnson (57) ABSTRACT

The invention includes a system and method for changing a playback speed of a selected video segment having a non-progressive frame structure which has been recorded onto a portion of a storage medium. A selected video segment can be modified for a changed playback speed and the modified video segment can be recorded exclusively on the portion of the storage medium. A plurality of non-video packs in the selected video segment can be deleted to reduce the amount of data contained in the modified video segment. The video segment can be modified by decoding the frames in the video segment, reencoding such frames into their associated field pictures and adding at least one field picture. Alternatively, the video segment can be modified by removing at least one frame or field picture contained in the video segment. In either arrangement, the video segment can be reencoded to produce a smoother trick mode and playback performance.

18 Claims, 9 Drawing Sheets

FIG. 3A $GOP_1: B_0\ B_1\ I_2\ B_3\ B_4\ P_5\ B_6\ B_7\ P_8\ B_9\ B_{10}\ P_{11}\ B_{12}\ B_{13}\ P_{14}$

FIG. 3B

$GOP_1: B_{0T}\ B_{0B}\ B_{1T}\ B_{1B}\ I_{2T}\ P_{2B}\ B_{3T}\ B_{3B}\ B_{4T}\ B_{4B}\ P_{5T}\ P_{5B}\ B_{6T}\ B_{6B}\ B_{7T}\ B_{7B}\ I_{8T}\ P_{8B}$ $B_{9T}\ B_{9B}\ B_{10T}\ B_{10B}\ P_{11T}\ P_{11B}\ B_{12T}\ B_{12B}\ B_{13T}\ B_{13B}\ P_{14T}\ P_{14B}$

FIG. 3C

$GOP_1: B_{0T}\ B_{0Td}\ B_{0B}\ B_{0Bd}\ B_{1T}\ B_{1Td}\ B_{1B}\ B_{1Bd}\ I_{2T}\ I_{2Td}\ P_{2B}\ P_{2Bd}\ B_{3T}\ B_{3Td}\ B_{3B}\ B_{3Bd}$ $B_{4T}\ B_{4Td}\ B_{4B}\ B_{4Bd}\ P_{5T}\ P_{5Td}\ P_{5B}\ P_{5Bd}\ B_{6T}\ B_{6Td}\ B_{6B}\ B_{6Bd}\ B_{7T}\ B_{7Td}$ $B_{7B}\ B_{7Bd}\ I_{8T}\ I_{8Td}\ P_{8B}\ P_{8Bd}\ B_{9T}\ B_{9Td}\ B_{9B}\ B_{9Bd}\ B_{10T}\ B_{10Td}\ B_{10B}\ B_{10Bd}$ $P_{11T}\ P_{11Td}\ P_{11B}\ P_{11Bd}\ B_{12T}\ B_{12Td}\ B_{12B}\ B_{12Bd}\ B_{13T}\ B_{13Td}\ B_{13B}\ B_{13Bd}$ $P_{14T}\ P_{14Td}\ P_{14B}\ P_{14Bd}$

$GOP_1:B_{0T}\ B_{0Td}\ B_{0B}\ B_{0Bd}\ B_{1T}\ B_{1Td}\ B_{1B}\ B_{1Bd}\ I_{2T}\ I_{2Td}\ P_{2B}\ P_{2Bd}\ B_{3T}\ B_{3Td}\ B_{3B}\ B_{3Bd}$ $B_{4T}\ B_{4Td}\ B_{4B}\ B_{4Bd}\ P_{5T}\ P_{5Td}\ P_{5B}\ P_{5Bd}\ B_{6T}\ B_{6Td}\ B_{6B}\ B_{6Bd}\ B_{7T}\ B_{7Td}$ $GOP_2:B_{7B}\ B_{7Bd}\ I_{8T}\ I_{8Td}\ P_{8B}\ P_{8Bd}\ B_{9T}\ B_{9Td}\ B_{9B}\ B_{9Bd}\ B_{10T}\ B_{10Td}\ B_{10B}\ B_{10Bd}$ $P_{11T}\ P_{11Td}\ P_{11B}\ P_{11Bd}\ B_{12T}\ B_{12Td}\ B_{12B}\ B_{12Bd}\ B_{13T}\ B_{13Td}\ B_{13B}\ B_{13Bd}$ $P_{14T}\ P_{14Td}\ P_{14B}\ P_{14Bd}$

FIG. 3F $GOP_1:B_{0T}\ B_{0Td}\ B_{0B}\ B_{0Bd}\ I_{1T}\ P_{1Td}\ B_{1B}\ B_{1Bd}\ B_{2T}\ B_{2Td}\ P_{2B}\ P_{2Bd}$ $B_{3T}\ B_{3Td}\ B_{3B}\ B_{3Bd}\ P_{4T}\ P_{4Td}\ B_{4B}\ B_{4Bd}\ B_{5T}\ B_{5Td}\ P_{5B}\ P_{5Bd}$ $B_{6T}\ B_{6Td}\ B_{6B}\ B_{6Bd}\ P_{7T}\ P_{7Td}$ $GOP_2:B_{7B}\ B_{7Bd}\ B_{8T}\ B_{8Td}\ I_{8B}\ P_{8Bd}\ B_{9T}\ B_{9Td}\ B_{9B}\ B_{9Bd}$ $P_{10T}\ P_{10Td}\ B_{10B}\ B_{10Bd}\ B_{11T}\ B_{11Td}\ P_{11B}\ P_{11Bd}\ B_{12T}\ B_{12Td}$ $B_{12B}\ B_{12Bd}\ P_{13T}\ P_{13Td}\ B_{13B}\ B_{13Bd}\ B_{14T}\ B_{14Td}\ P_{14B}\ P_{14Bd}$

FIG. 3G

FIG. 4A $GOP_1$: $B_0$ $B_1$ $I_2$ $B_3$ $B_4$ $P_5$ $B_6$ $B_7$ $P_8$ $B_9$ $B_{10}$ $P_{11}$ $B_{12}$ $B_{13}$ $P_{14}$
$GOP_2$: $B_{15}$ $B_{16}$ $I_{17}$ $B_{18}$ $B_{19}$ $P_{20}$ $B_{21}$ $B_{22}$ $P_{23}$ $B_{24}$ $B_{25}$ $P_{26}$ $B_{27}$ $B_{28}$ $P_{29}$

FIG. 4B $GOP_{1+2}$: $I_2$ $B_3$ $P_5$ $P_8$ $B_9$ $P_{11}$ $B_{13}$ $P_{14}$ $B_{16}$ $I_{17}$ $P_{20}$ $B_{21}$ $P_{23}$ $B_{24}$ $P_{26}$ $B_{28}$ $P_{29}$

FIG. 4C $GOP_1$: $B_0$ $B_1$ $I_2$ $B_3$ $B_4$ $P_5$ $B_6$ $B_7$ $P_8$ $B_9$ $B_{10}$ $P_{11}$ $B_{12}$ $B_{13}$ $P_{14}$
$GOP_2$: $B_{15}$ $B_{16}$ $I_{17}$ $B_{18}$ $B_{19}$ $P_{20}$ $B_{21}$ $B_{22}$ $P_{23}$ $B_{24}$ $B_{25}$ $P_{26}$ $B_{27}$ $B_{28}$ $P_{29}$

FIG. 4D $GOP_{1+2}$: $B_0$ $I_2$ $B_4$ $B_6$ $P_8$ $B_{10}$ $B_{12}$ $P_{14}$ $B_{16}$ $B_{18}$ $P_{20}$ $B_{22}$ $B_{24}$ $P_{26}$ $B_{28}$

FIG. 4E $GOP_{1+2}$: $B_0$ $B_2$ $I_4$ $B_6$ $B_8$ $P_{10}$ $B_{12}$ $B_{14}$ $P_{16}$ $B_{18}$ $B_{20}$ $P_{22}$ $B_{24}$ $B_{26}$ $P_{28}$

GOP$_1$: B$_0$ B$_1$ I$_2$ B$_3$ B$_4$ P$_5$ B$_6$ B$_7$ P$_8$ B$_9$ B$_{10}$ P$_{11}$ B$_{12}$ B$_{13}$ P$_{14}$
GOP$_2$: B$_{15}$ B$_{16}$ I$_{17}$ B$_{18}$ B$_{19}$ P$_{20}$ B$_{21}$ B$_{22}$ P$_{23}$ B$_{24}$ B$_{25}$ P$_{26}$ B$_{27}$ B$_{28}$ P$_{29}$

FIG. 5B

GOP$_1$: B$_0$ B$_1$ I$_2$ B$_3$ B$_4$ P$_5$ B$_6$ B$_7$ P$_8$ B$_9$ B$_{10}$ P$_{11}$ B$_{12}$ B$_{13}$ P$_{14}$
GOP$_2$: B$_{15}$ B$_{16}$ I$_{17}$ B$_{18}$ B$_{19}$ P$_{20}$ B$_{21}$ B$_{22}$ P$_{23}$ B$_{24}$ B$_{25}$ P$_{26}$ B$_{27}$ B$_{28}$ P$_{29}$

FIG. 5C

GOP$_{1+2}$: B$_0$ B$_1$ I$_2$ B$_3$ B$_4$ P$_5$ B$_6$ B$_7$ P$_8$ B$_9$ B$_{10}$ P$_{11}$ B$_{12}$ B$_{13}$ P$_{14}$ B$_{15}$ B$_{16}$ I$_{17}$ B$_{18}$ B$_{19}$ P$_{20}$ B$_{21}$ B$_{22}$
P$_{23}$ B$_{24}$ B$_{25}$ P$_{26}$ B$_{27}$ B$_{28}$ P$_{29}$

FIG. 5D

GOP$_{1+2}$: B$_0$ B$_1$ B$_2$ B$_3$ I$_4$ P$_5$ B$_6$ B$_7$ B$_8$ B$_9$ P$_{10}$ P$_{11}$ B$_{12}$ B$_{13}$ B$_{14}$ B$_{15}$ P$_{16}$ P$_{17}$ B$_{18}$ B$_{19}$ B$_{20}$ B$_{21}$
P$_{22}$ P$_{23}$ B$_{24}$ B$_{25}$ B$_{26}$ B$_{27}$ P$_{28}$ P$_{29}$

FIG. 5E

CHANGING A PLAYBACK SPEED FOR VIDEO PRESENTATION RECORDED IN A NON-PROGRESSIVE FRAME STRUCTURE FORMAT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The inventive arrangements relate generally to methods and apparatus providing advanced operating features for programs recorded on disc media, for example recordable digital video discs, hard drives and magneto optical discs.

2. Description of the Related Art

While conventional trick modes enable a user to view recorded video at different speeds, the video is not permanently altered by the process. If the video is displayed at a later time, then the user must initiate another trick mode to view the video at a different speed. Significantly, however, many users may wish to permanently change the playback speed of a particular portion of video by modifying the video once the video has been recorded onto the media. Such a process can permit speed variations during playback without the user invoking a trick mode command. Unfortunately, several significant obstacles exist that make editing recorded video in such a fashion impracticable.

For example in the case of media such as magnetic tape and optical disc media such as DVD, it is desirable to record program data in a contiguous manner on the medium so as to avoid interruptions in program presentation. Typically, however, the space occupied by the original recorded video is not large enough to store the pictures that must be repeated in order to produce certain trick effects such as slow motion playback. This makes it difficult to store a modified video segment in the same physical location as the original data. In addition to spatial limitations, repeating pictures on the disc or other media can interfere with the conventional picture structure of the video, which can degrade the display quality of the video during playback.

Modifying recorded video to produce fast-forward playback, however, is not affected by the spatial limitations that impede slow-motion editing. This is because fast-forward editing typically deletes pictures from the recorded video. Nevertheless, creating fast-forward video, similar to slow-motion modification, also negatively impacts the conventional picture structure of the video.

Performing trick modes on video recorded under a non-progressive scanning format, particularly when a moving object is recorded, can present another problem as well. Non-progressive frames are not progressively scanned but are actually two interlaced fields that have been merged to create a frame. Each interlaced field contains roughly one-half the picture information typically contained in a complete frame. These interlaced fields, however, are temporally distinct, and moving objects will appear in a different location in each field. Thus, if the fields are combined to form a non-progressive frame, a moving object will appear elongated.

In a number of high-performance televisions, the fields from a non-progressive frame are separated and deinterlaced to form two complete frames. As such, a moving object will appear in a different location in the newly created frames. During trick mode playback, the frames created from the deinterlacing process are typically alternately repeated and displayed. This can cause moving objects in the display to appear to jump, or vibrate, from one location to another resulting in an unwanted artifact.

Thus, what is needed is a device that can change the playback speed of video recorded under a non-progressive scanning format yet can overcome the spatial and structural limitations associated with such recorded video. Moreover, such a device must avoid the unwanted vibration artifact that is associated with this type of recorded video during trick mode playback.

SUMMARY OF THE INVENTION

In a rewritable storage medium, the invention includes a method for changing a playback speed of a selected video segment having a non-progressive frame structure which has been recorded on a portion of the storage medium. In one arrangement, the invention includes the steps of: modifying the selected video segment for a changed playback speed; and recording the modified video segment exclusively on the portion of the medium. The invention can also include the step of deleting a plurality of non-video packs in the selected video segment to reduce an amount of data contained in the modified video segment. Further, the invention can also include the steps of reducing a resolution of at least one frame contained in the modified video segment and lowering a bit rate of the modified video segment during the recording step.

In one arrangement of the above invention, the video segment can be comprised of intra and non-intra frames and the modification can comprise the steps of: decoding the intra and non-intra frames; reencoding the intra and non-intra frames into their associated field pictures; and inserting at least one of the group consisting of dummy field pictures and repeat field pictures into the selected video segment. In addition, the number of dummy field pictures and repeat field pictures inserted into the selected video segment can be based on the changed playback speed. Moreover, the invention can include the step of selectively decoding and reencoding the modified video segment for conventional placement of the dummy field pictures, the repeat field pictures and the associated field pictures.

In another arrangement of the above method, the video segment can be comprised of intra and non-intra frames and the modification can include the step of removing at least one frame from the group consisting of the intra and non-intra frames. Alternatively, the video segment can include intra and non-intra frames, and the modification can include the steps of: decoding the intra and non-intra frames; and removing at least one field picture from at least one of said intra and non-intra frames.

In another arrangement, the invention includes a system for changing a playback speed of a selected video segment having a non-progressive frame structure recorded on a rewritable storage medium. The above system includes: storage medium circuitry for selectively reading a video segment which has been recorded on a portion of the rewritable storage medium; a video processor for modifying the selected video segment for a changed playback speed; and video recording circuitry for recording the modified video segment exclusively on the portion of the storage medium. The system also includes suitable software and circuitry to implement the method as described above.

DETAILED DESCRIPTION OF THE PREFERRED EMBODIMENTS

Recordable DVD Device

Figure 1:
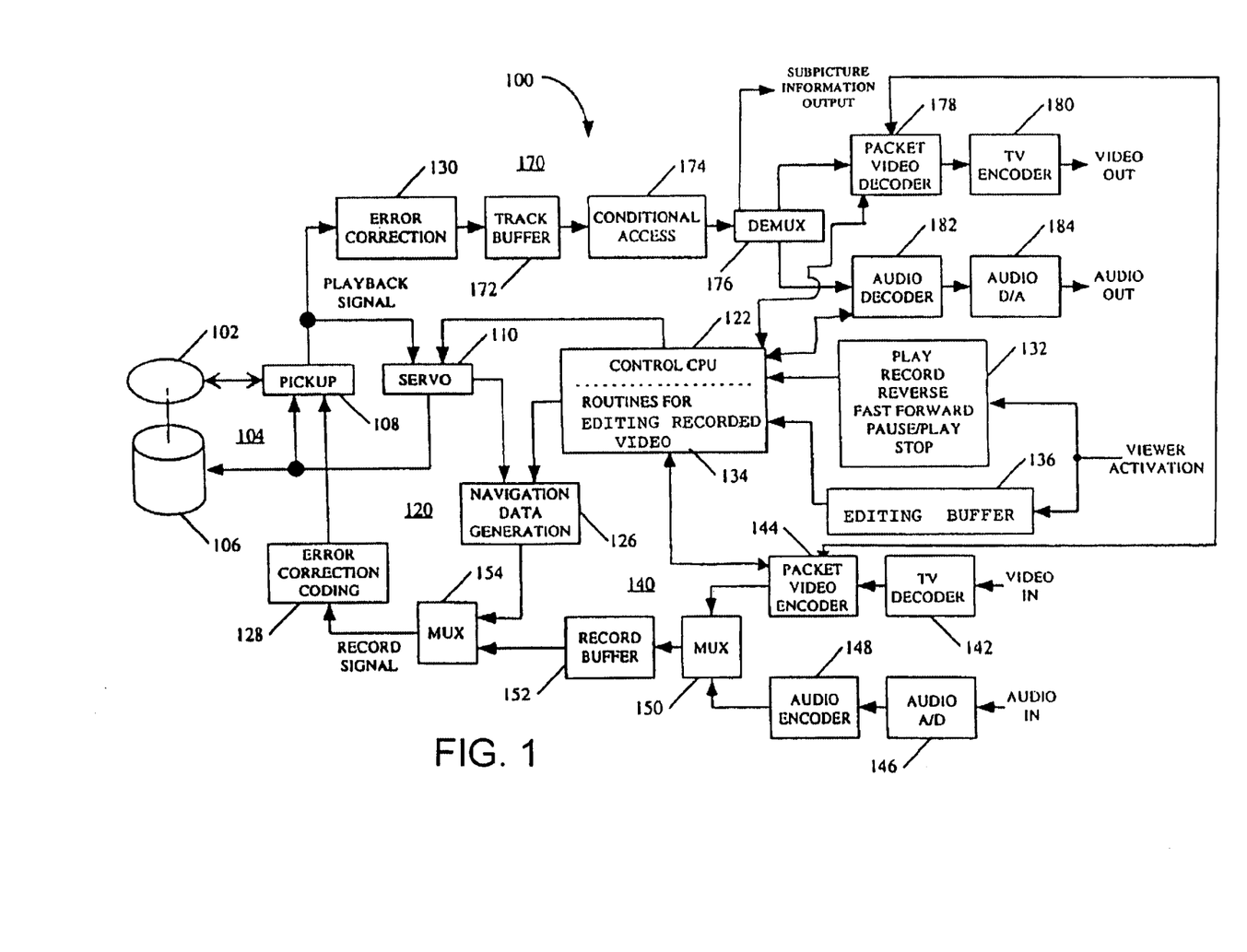
FIG. 1 is a block diagram of a rewritable DVD device that can change the playback speed of video recorded in a non-progressive frame structure format in accordance with the inventive arrangements herein.

A device 100 for implementing the various advanced operating features in accordance with the inventive arrangements is shown in block diagram form in FIG. 1. A rewritable disc medium is embodied as a rewritable DVD in the illustrated embodiment. In many instances, as will be noted, the rewritable disc medium can also be, for example, a hard drive or a magneto optical disc (MOD). An example of a MOD is a mini-disc. Moreover, the invention can also be used in a digital tape machine. In fact, the invention is not limited to any particular storage medium device, as it can be used in any other suitable storage medium device.

The device 100 is capable of writing onto and reading from a storage medium, in this example, a rewritable DVD 102. Although the following discussion primarily concerns rewritable DVD, the invention is not so limited, as any other suitable storage medium can be used. The device can comprise a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 can include a motor 106 for spinning the disc 102 and a pickup assembly 108 that can be adapted to be moved over the disc 102 as the disc 102 spins. A laser on the pickup assembly 108 can burn spots onto a spiral track on the disc 102 and can illuminate spots already burned onto the track for recording and playing back video and/or audio program material. For purposes of understanding the invention, it is irrelevant whether the disc 102 is recordable on one or two sides, or in the event of a double-sided recording, whether the double-sided recording, or subsequent reading from the disc 102, takes place from the same side of the disc 102 or from both sides. The pickup assembly 108 and the motor 106 can be controlled by a servo 110. The servo 110 can also receive the Playback Signal of data read from the spiral track of the disc 102 as a first input. The Playback Signal is also an input to an error correction circuit 130, which can be considered part of the control section or part of the video/audio output processing path 170.

The control section 120 can comprise a control central processing unit (CPU) 122 and a navigation data generation circuit 126. The control CPU 122 can supply a first input signal to the navigation data generation circuit 126, and the servo 110 can supply a second input signal to the navigation data generation circuit 126. The servo 110 can also be considered part of the control section 120. The navigation data generation circuit 126 can supply a first input signal to the multiplexer (MUX) 154, which can form part of the video/audio input processing path 140.

The output of the MUX 154 can be an input to an error correction coding circuit 128. The output of the error correction coding circuit 128 can be a recordable input signal supplied to the pickup 108, which can be Aburned@ onto the spiral track of the disc 102 by the laser.

In addition, control and data interfaces can also be provided for permitting the CPU 122 to control the operation of the video encoder 144, video decoder 178 and audio decoder 182. Suitable software or firmware can be provided in memory for the conventional operations performed by control CPU 122. Further, program routines for the editing recorded video features 134 are provided for controlling CPU 122 in accordance with the inventive arrangements.

A control buffer 132 for viewer activatable functions can indicate those functions presently available, namely play, record, reverse, fast forward, slow play, jump, pause/play and stop. In addition, an editing buffer 136 can be provided to receive commands for implementing the recorded video editing features.

The output processing path 170 can comprise an error correction block 130, a track buffer 172, a conditional access circuit 174 and a demultiplexer 176. The track buffer 172 can read and temporarily store for further processing data read from the disc 102. This data can be processed by the conditional access circuit 174, which can control propagation of the data through the demultiplexer 176 and into respective paths for video and audio processing. Additionally, the output processing path 170 can include a packet video encoder 178, a TV encoder 180, an audio decoder 182 and an audio D/A 184.

The video/audio input processing path 140 can be a signal processing circuit for converting a conventional television signal into digitized packet data for digital recording by the device 100. The input path 140 can include a TV decoder 142 and the packet video encoder 144. In addition, the input processing path 140 can include an audio A/D 146 and an audio encoder 148. During normal operation, the digitized signals can be combined in a multiplexer 150 and can then be stored in the record buffer 152 until an entire packet has been constructed. As groups of audio and video data packets are created, they can be combined in multiplexer 154 with appropriate navigation packets generated in the navigation generation block 126. The packets can then be sent to the error correction coding circuit 128. Error correction coding circuit 128 can also be deemed to be part of the input path 140.

If a user wishes to edit a portion of video stored on the disc 102, the editing buffer 136 can signal the control CPU 122. In one arrangement, the control CPU 122 can signal the packet video encoder 178 to decode the pictures contained in the video being read from a particular location on the disc 102 and then to send the video containing the decoded pictures to a packet video encoder 144. As will be explained later, in an alternative arrangement, only a selected number of these pictures need to be decoded during the editing process. In either arrangement, any audio associated with the pictures can be forwarded to the audio decoder 182. The control CPU 122 can then instruct the audio decoder 182 to store the audio temporarily. For purposes of creating extra space, however, the audio is generally not recombined with the video during the editing process. Rather, the audio is typically discarded when the storage buffer in the audio decoder 182 overflows. In addition to removing the audio component, any subpicture information associated with the modified video can be separated and prevented from reintegrating with the modified video.

Once the video signal containing the decoded pictures is received at the packet video encoder 144, the video encoder 144 can modify the video signal by adding or deleting pictures. As will be explained in detail below, adding pictures to the video signal can create slow-motion video and deleting pictures from the video can produce fast-forward video. If necessary, the video encoder 144 can then reencode these pictures so that the modified video can be placed on the disc 102.

After the pictures in the edited video signal have been reencoded, the video signal can merely propagate through the multiplexer 150 since audio is typically not combined with the modified video signal. The edited video is then processed in a fashion similar to that of normal video. That is, the modified video signal is combined with navigation data in the multiplexer 154 and error corrected by error correction coding circuit 128. As will be explained later, the edited video signal can then be recorded back onto the disc 102 in its original location on the media.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Data Structure

Figure 2:
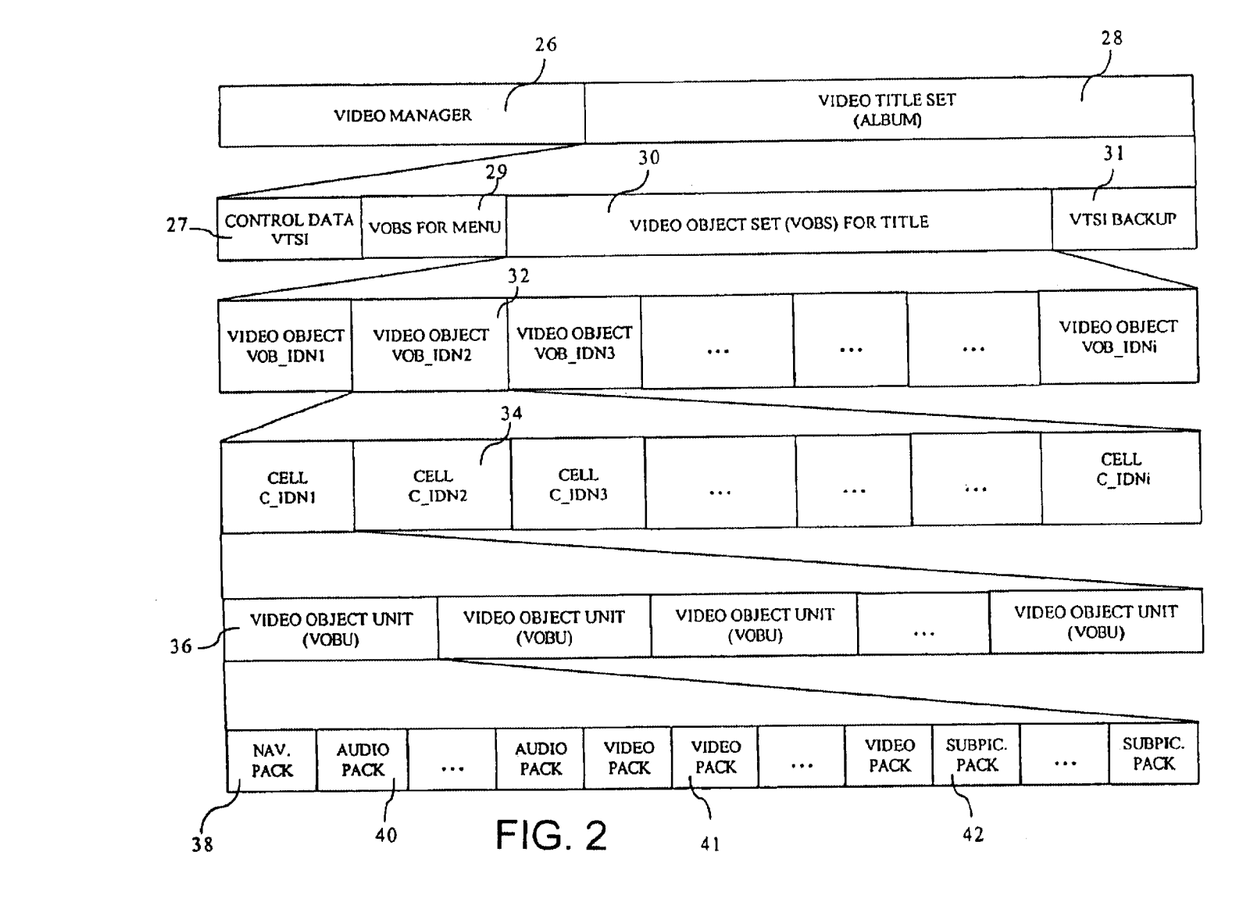
FIG. 2 illustrates a data structure of a rewritable DVD disc.

FIG. 2 illustrates a typical DVD arrangement. However, variations in the structure shown are possible, and the invention is not intended to be limited to the particular embodiment shown. As shown in FIG. 2, each DVD contains a video manager 26 and a video title set (VTS) 28. The VTS includes video title set information (VTSI) 27, an optional video object set for menu 29, one or more VOBS for title 30 which contains the actual title content and a VTSI backup 31. Each VOBS 30 is comprised of a plurality of video objects (VOB) 32. Each video object 32 includes a plurality of cells 34. Each VOBS 30 also includes a collection of pointers to one or more cells. In this way, the VOBS 30 data links the cells 34 together and indicates in what order the programs or cells 34 are to be played. The cells 34 within a particular VOBS 30 can be flagged for play in any desired order. For example, they can be played sequentially or randomly.

Each cell 34 includes a plurality of video object units (VOBU) 36. Each of the VOBU's 36 in which the video content of the disc resides typically contains 0.4 to 1.0 seconds of presentation material. Each VOBU starts with exactly one navigation pack (NV_PCK) 38 and can include one or more audio packs (A_PCK) 40, one or more video packs (V_PCK) 41 and one or more subpicture packs (SP_PCK) 42. In addition, each VOBU 36 is nominally comprised of one group of pictures (GOP).

Changing Playback Speed for Video Presentation

Recorded in a Non-Progressive Frame Structure Format

In accordance with the inventive arrangements, a user may alter the playback speed of non-progressive frame video that has already been recorded onto a storage medium. If the user desires to edit the recorded video to produce slow motion video, then one or more pictures may be inserted into the video to create such an effect. The altered video can then be recorded onto the storage medium in the same space previously occupied by the original video. If the user desires to create fast-forward video, then one or more pictures may be removed from the recorded video. Similar to the slow motion editing process, the video can be recorded in the original video=s medium space. In either process, the edited video may be reencoded to produce higher quality playback and trick mode operation.

The following is a conventional GOP structure in an MPEG video stream containing non-progressive frames in display order, which can be helpful in explaining the inventive arrangements:

$B_0\ B_1\ I_2\ B_3\ B_4\ P_5\ B_6\ B_7\ P_8\ B_9\ B_{10}\ P_{11}\ B_{12}\ B_{13}\ P_{14}$

Experience has shown that placing two bidirectional predictive (B) frames between each intra (I) or predictive (P) frame works well. Accordingly, the conventional GOP structure as shown is commonly used. Those skilled in the art will appreciate that other GOP structures are also commonly used and may be considered conventional.

The frames shown in the above conventional GOP structure are non-progressive frames and are in bold print to indicate their status as non-progressive frames. Non-progressive frames are created when two separate interlaced field pictures are combined to form a complete picture. The non-progressive frames shown above actually contain two interlaced fields. As will be explained below, there are certain instances when it is desirable to split non-progressive frames into their associated interlaced fields. For purposes of distinguishing the field pictures from the frames, the field pictures will be presented in normal print.

The following is an example of a conventional GOP structure containing field pictures:

$B_{0T} B_{0B} B_{1T} B_{1B} I_{2T} I_{2B} B_{3T} B_{3B} B_{4T} B_{4B} P_{5T} P_{5B} B_{6T} B_{6B}$
$B_{7T} B_{7B} P_{8T} P_{8B} B_{9T} B_{9B} B_{10T} B_{10B} P_{11T} P_{11B} B_{12T}$
$B_{12B} B_{13T} B_{13B} P_{14T} P_{14B}$

As shown, pictures with the subscript "T" represent the top field pictures, and pictures with the subscript "B" represent the bottom field pictures.

The GOP structures selected for purposes of illustrating the inventive arrangements are merely examples of GOP structures that can be used to practice the invention, as the invention is not limited to any particular type of GOP structure. In fact, the invention can be applicable to those MPEG encoders that are designed to encode only P frames and I frames or those encoders that are limited to encoding only I frames.

Figure 3A:
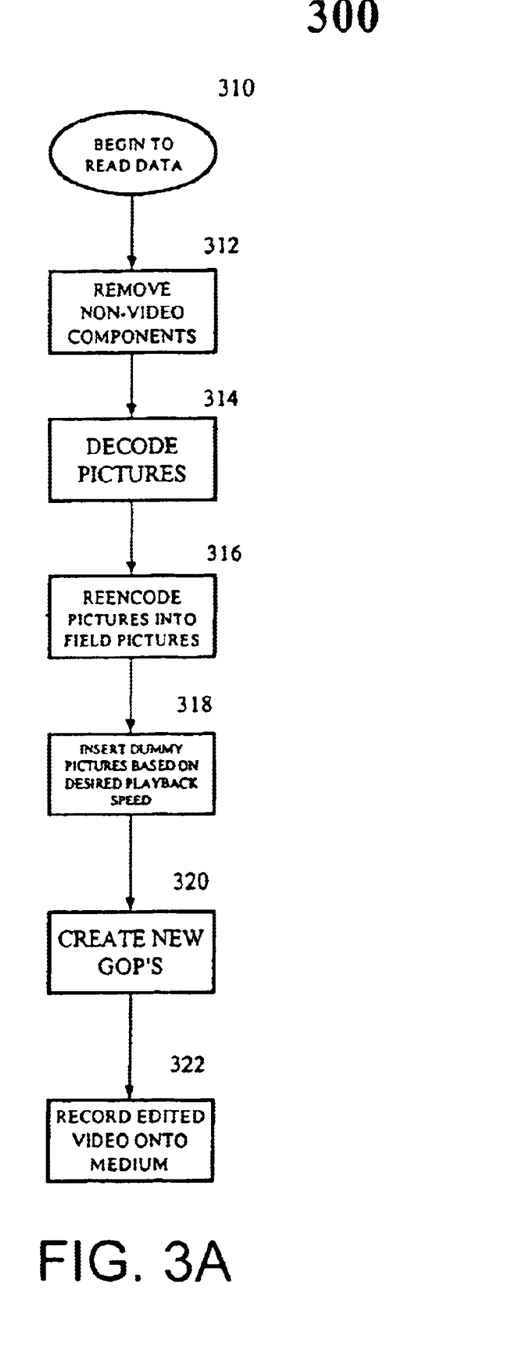
FIG. 3A is a flow chart that illustrates the operation of changing the playback speed for video presentation recorded in a non-progressive frame structure format to produce slow motion playback.

Referring to FIG. 3A, a flowchart 300 illustrates how slow motion editing can be performed on video containing non-progressive frames. FIGS. 3B through 3G illustrate an example of this slow motion editing process. In particular, FIGS. 3B through 3G demonstrate how a single conventional GOP can be altered to produce a one-half playback speed; however, it should be noted that the invention is not so limited, as any portion of video may be changed to playback at any speed slower than normal playback.

Figure 3B:
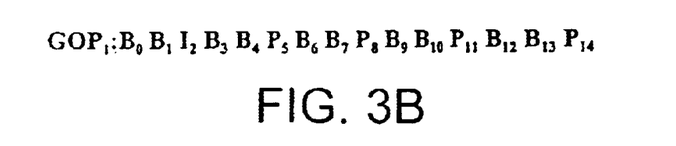
FIGS. 3B–3G demonstrate the editing process of FIG. 3A as applied to a conventional GOP to produce a one-half playback speed.

Beginning at step 310 in FIG. 3A, the device 100 can begin to read data from the storage medium. In step 312, the demultiplexer 176 of FIG. 1 can separate the video component of the recorded video signal from the non-video components and can the discard the non-video components. Examples of non-video components include A_PCK's 40 and SP_PCK's 42. The NV_PCK's 38, however, can be left in the video signal being edited since, in accordance with DVD standards, each VOBU 36 is required to have an NV_PCK 38. Next, the pictures that make up the video signal can be decoded by the packet video decoder 178 and can then be transferred to the packet video encoder 144, as shown in step 314. FIG. 3B shows the form of a conventional GOP containing non-progressive frames as it is presented to the packet video encoder 144.

Figure 3C:
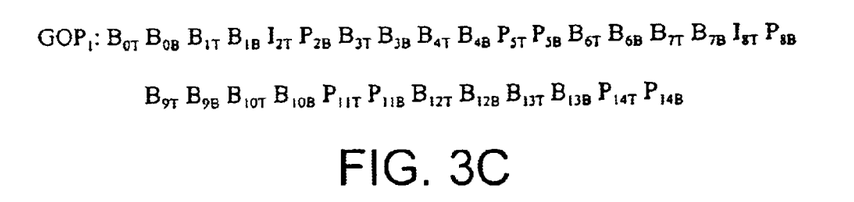

Referring again to FIG. 3A, in step 316 each frame in the video signal can be reencoded into its associated field pictures. An example of this process is shown in FIG. 3C with the subscript "T" representing the top field pictures and the subscript "B" representing the bottom field pictures. These field pictures are shown in normal font, as distinguished from the frames shown in bold font in FIG. 3B.

As also illustrated in FIG. 3C, one or more I frames in the video signal can be reencoded into an I field picture and a P field picture. An individual field picture will contain less information (approximately 50% less) than a complete frame. Reencoding each I frame into two I field pictures does not necessarily reduce the amount of information that must be stored on the storage medium; however, reencoding each I frame into an I field picture and a P field picture helps reduce the amount of information needed to be stored on the storage medium since a P field picture typically requires less storage space than an I field picture. It should be noted, however, that the invention is not so limited, as the I frames can be reencoded into any other suitable format.

In addition to the I frames, one or more non-I frames may be reencoded into I and P field pictures. Adding pictures to a video stream may create the need to form new GOP's to store the added pictures. As such, each of these new GOP's requires a reference frame or field from which to construct and display the remaining non-intra frames. Reencoding a non-I frame into I and P field pictures can ensure that any new GOP's will have the necessary reference frame or fields to display the remaining non-intra frames. An example is also shown in FIG. 3C, as frame $P_8$ can be reencoded into field pictures $I_{8T} P_{8B}$. It should be noted, however, that FIG. 3C is merely an example, as any other suitable frame can be reencoded to serve as a reference picture.

Figure 3D:
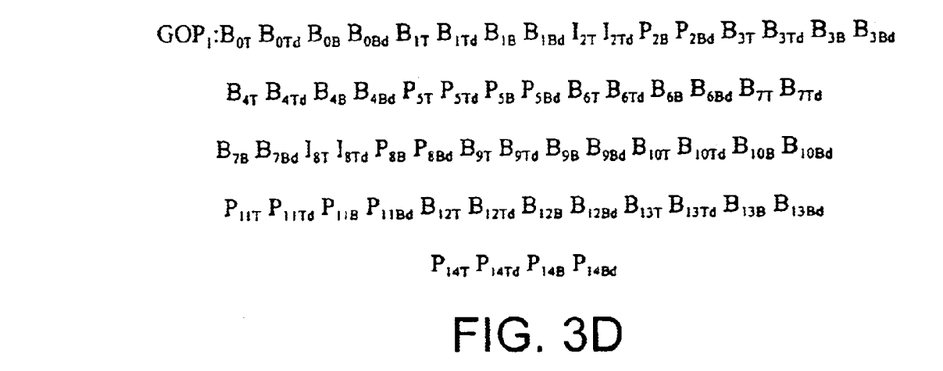

At step 318 in FIG. 3A, one or more dummy field pictures can be inserted into the video signal. Reencoding the non-progressive frames in the video being edited into field pictures can permit the insertion of dummy field pictures in the video at step 318. An example of inserting dummy field pictures is shown in FIG. 3D. A dummy field picture is an MPEG picture which is merely a repeat of a particular I field or non-I field picture. Notably, however, the discrete cosine transform (DCT) coefficients and the motion vectors of a dummy field picture are typically set to zero. Thus, dummy field pictures require very little storage space on the storage medium. Typically, dummy pictures are already in a compressed format and, therefore, do not have to be reencoded prior to being recorded onto the storage medium; however, the invention is not limited in this regard.

In one arrangement, dummy field pictures can be placed either before or after each field picture in the video signal being altered; however, the invention is not so limited, as the dummy field pictures can be inserted anywhere in the video signal. The number of dummy pictures inserted into the video signal depends on the selected slow motion speed. For example, a single dummy field picture can be inserted either before or after each field picture in the video signal, including each I field picture, to produce a playback speed that is one-half of normal playback speed. FIG. 3D is an example of this process. A slower playback speed requires the insertion of a greater number of dummy field pictures.

Figure 3E:
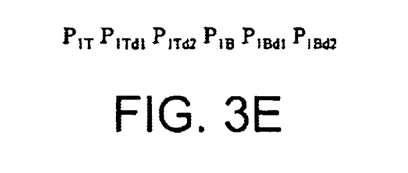

Although these dummy field pictures can be inserted anywhere in the video being edited, in one arrangement, the dummy field pictures can be strategically inserted to help control the motion artifact known as vibrating pictures. That is, the dummy field pictures that are top field pictures can be sequentially placed. For example, if the desired playback was one-third that of normal playback, then two dummy top field pictures can be inserted either before or after the top field picture being copied. Additionally, the original top field picture can be placed between the dummy top field pictures. Similarly, this process can be duplicated for the bottom field pictures. FIG. 3E shows an example of this procedure. Inserting the dummy field pictures in this manner can enable a particular field picture and its associated dummy field pictures to be displayed in a sequential order. This can help eliminate the problem of vibrating pictures, which sometimes occurs when interlaced pictures are displayed in trick mode.

Referring back to FIG. 3E, during playback, the top field $P_{1T}$ and its two dummy field pictures $P_{1Td1}$, $P_{1Td2}$ can be displayed in succession due to the sequential insertion of the top field pictures. Likewise, the bottom field $P_{1B}$ and its associated dummy field pictures $P_{1Bd1}$, $P_{1Bd2}$ can be consecutively displayed as well. If a moving object is in the top field $P_{1T}$, then it will be in the same location in the dummy field pictures $P_{1Td1}$, $P_{1Td2}$. If bottom fields were inserted between these top fields, then the moving object would appear to jump back and forth on a display device, as the moving object is located in a different area in the bottom fields. Accordingly, if the non-progressive frames were not reencoded into their associated field pictures, then the top and bottom field pictures could not be grouped in succession, as illustrated in FIG. 3E. As a result, the original top and bottom fields and the dummy top and dummy bottom fields would be displayed in an alternate fashion, which would produce the vibration artifact during playback of the edited video.

Figure 3F:
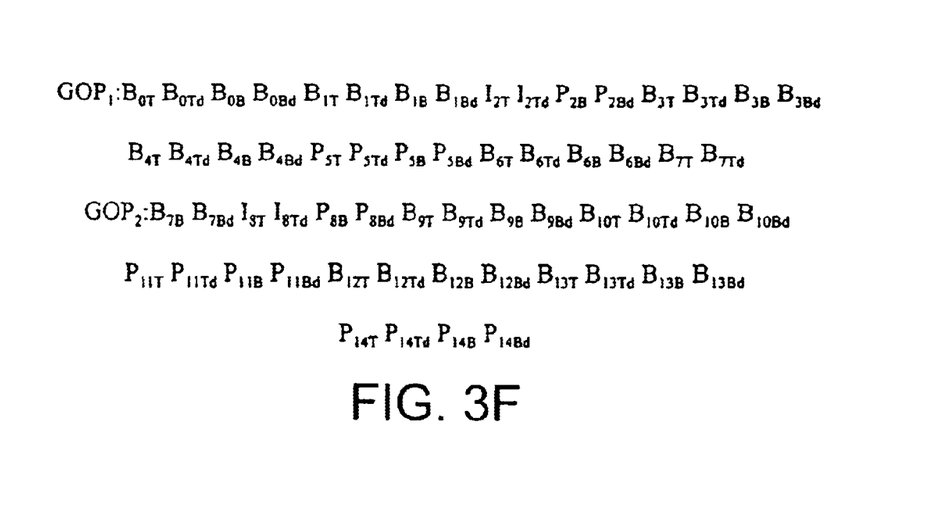

After the dummy pictures are placed in the video signal as shown in FIG. 3D, the GOP can be divided into two or more new GOP's illustrated in FIG. 3F and as shown in step 320 in FIG. 3A. It is desirable to separate the video signal into two or more new GOP's because the number of pictures in the portion of video being edited has increased due to the addition of dummy pictures, and industry standards limit the number of fields that a GOP can contain to thirty-six. This equates to a maximum of eighteen frames per GOP. Although up to thirty-six fields, or eighteen frames, can be placed in either the original GOP or the newly created GOP's, an equal number of pictures is preferably placed in each GOP thereby enabling each GOP to undergo further processing, if desired, in order to conform to the conventional GOP structure. FIG. 3F shows an example of this result.

The new GOP's can now be recorded onto the storage medium, as shown in step 322. In accordance with the inventive arrangements, the edited video can be placed in the same space that the original video previously occupied. This is because any dummy field pictures that have been placed in the video require very little storage space since they do not contain any encoded image information. Further, whatever storage space is required to fit these field pictures into the original space can be accommodated using the space on the storage medium that was previously used to store the deleted non-video information.

In one arrangement, however, if there is not enough room on the storage medium to fit the edited video in the original recording location, then a certain number of field pictures in the edited video can be decoded and then reencoded to reduce their picture resolution. Such a process can reduce the amount of storage space required for the pictures. In an alternative arrangement, the bit rate of the video signal can be lowered as the video is being placed onto the storage medium. Although lowering the bit rate can result in the loss of some of the video data and a corresponding reduction in picture resolution, such a process can reduce the amount of physical space required on the media to record the modified video sequence and therefore permit the edited video signal to fit in the original recording location.

Figure 3G:
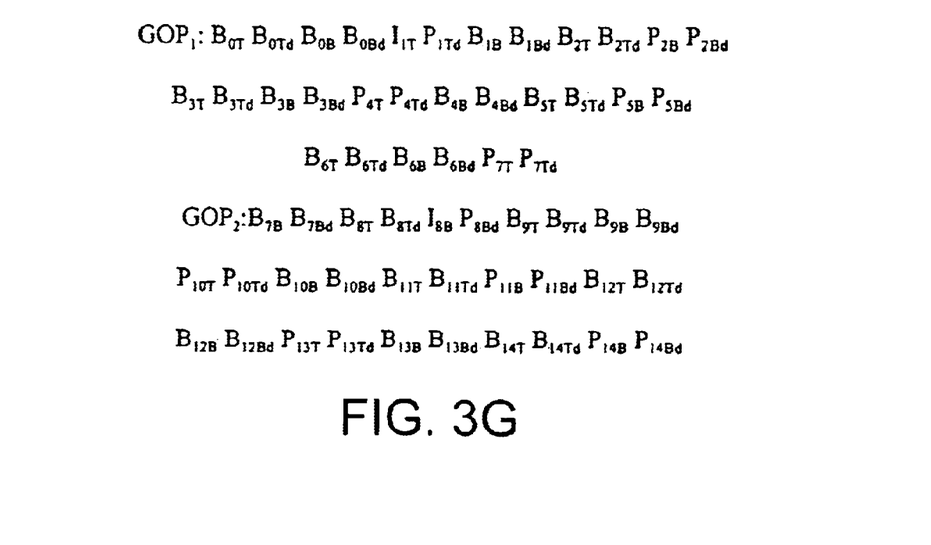

In an alternative embodiment, once the dummy pictures have been added, one or more of the GOP's containing the edited video can be reencoded to match the conventional GOP structure containing field pictures reproduced above. Reencoding the new GOP's into a conventional GOP structure can produce a smoother playback and can improve trick mode performance. To do so, a number of the field pictures in the GOP's can be decoded and then subsequently reencoded into the conventional GOP format. As an example, referring to FIGS. 3F and 3G, field pictures $B_{0T}$, $B_{0Td}$, $B_{0B}$ and $B_{0Bd}$ of $GOP_1$ do not have to be decoded and then reencoded since a conventional GOP typically begins with two B frames or four B fields. Continuing with the example, field pictures $B_{1T}$ and $B_{1Td}$, however, can be decoded and reencoded into field pictures $I_{1T}$ and $P_{1T}$. These field pictures can now serve as the reference frame for $GOP_1$. This process can continue until the structure of the $GOP_1$ and $GOP_2$ matches a conventional structure, as shown in FIG. 3G. It should be noted, however, that the foregoing discussion is merely an example, as any other suitable sequence can be used to reencode one or more of the GOP's in the edited video into conventional GOP's.

In another arrangement, in lieu of adding dummy field pictures, one or more repeat field pictures can be added to the video being edited to produce the slow motion playback. Alternatively, a combination of dummy field and repeat field pictures can be added to the video being edited to produce slow motion playback. A repeat field picture is an uncompressed picture that is a duplicate of its parent field picture. Adding repeat field pictures entails a process that is similar to that of inserting dummy field pictures. One notable difference, however, is that repeat field pictures need to be encoded before being recorded onto the storage medium.

Figure 4A:
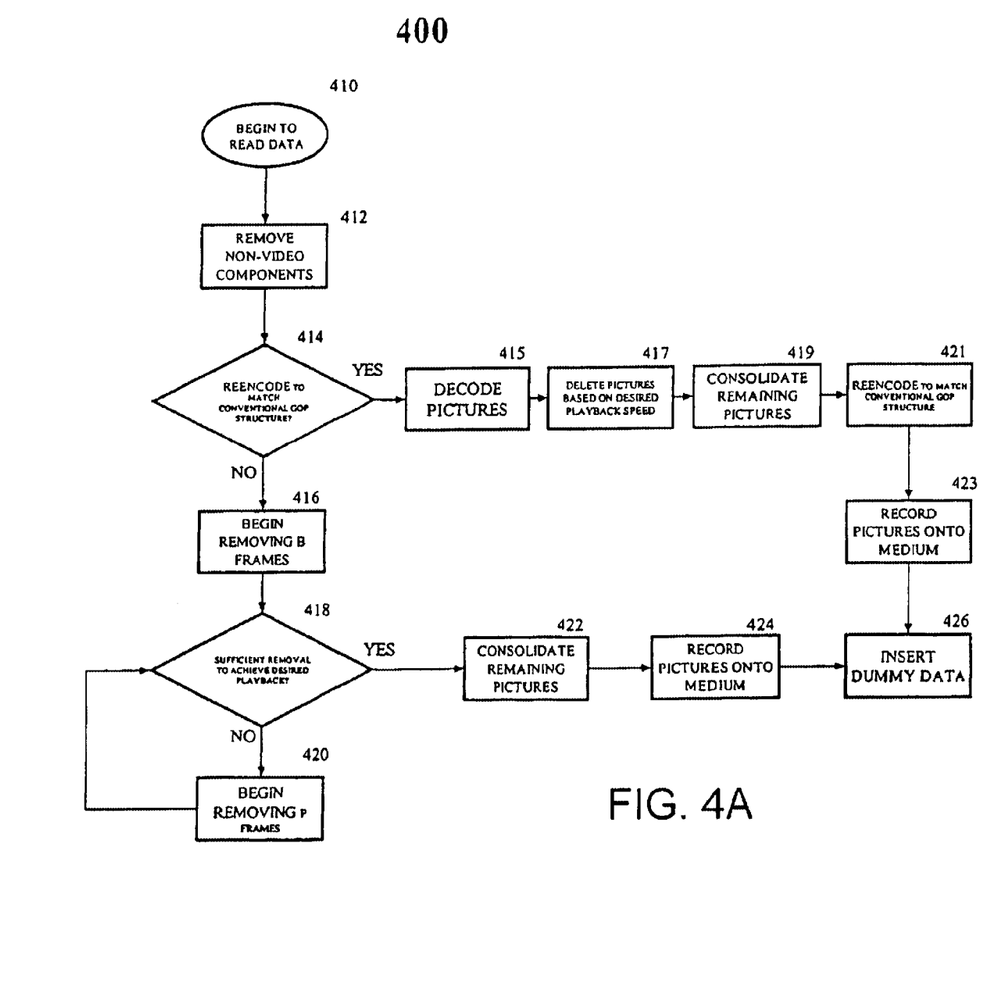
FIG. 4A is a flow chart that illustrates the operation of changing the playback speed for video presentation recorded in a non-progressive frame structure format to produce fast motion playback.
Figure 4B:
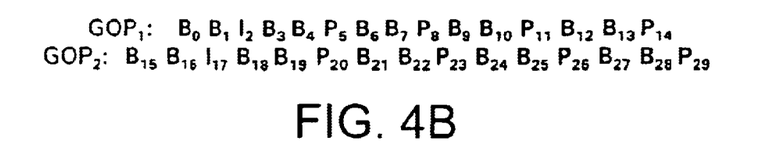
FIGS. 4B–4F demonstrate the editing process of FIG. 4A as applied to two conventional GOP's to produce a doubled playback speed.

Referring to FIG. 4A, a flowchart 400 illustrates two ways how fast motion editing can be performed on video created under a non-progressive scanning format. FIGS. 4B through 4F illustrate an example of each of these fast motion editing processes as applied to two GOP's to create a double speed playback; however, it should be noted that the invention is not so limited, as any portion of video may be changed to playback at any speed faster than normal playback. In step 410, the device 100 can begin to read data from the storage medium. In step 412, the demultiplexer 176 of FIG. 1 can separate the video component of the recorded video signal from the non-video components, such as A_PCK's 40 and SP_PCK's 42. The non-video components can then be discarded. Similar to the slow motion process of FIG. 3A, the NV_PCK's 38 can be left in the video signal being edited. FIG. 4B shows the form of two conventional GOP's as they are presented to the packet video encoder 144.

Figure 4C:
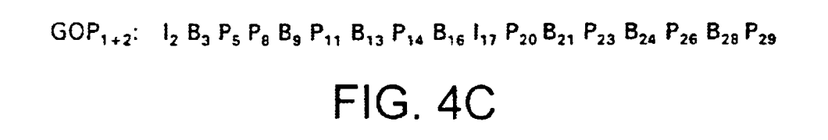

As shown in step 414, if the edited video will not undergo a reencoding step to conform each edited GOP to a conventional GOP structure, then B frames can be removed from the video signal. This process is shown at step 416 in FIG. 4A and in FIG. 4C. Referring to FIG. 4C, the B frames removed can be distributed throughout the GOP rather than in lengthy groups containing successive B frames. Removing B frames in this fashion is preferable because it will produce a smoother playback and trick mode performance. As an example, in FIG. 4C, frames $B_0$ and $B_1$ can be removed and then frame $B_3$ can be retained before frames $B_4$, $B_6$ and $B_7$ are deleted. Subsequently, frame $B_9$ can be retained and the deletion process can continue. It should be noted, however, that the example shown in FIG. 4C is not intended to limit the invention to this particular deletion sequence, as any other suitable deletion sequence may be used.

The overall number of pictures deleted from the video signal depends on the selected fast motion speed. For example, to produce a playback speed twice as fast as normal playback, one-half of the pictures contained in each GOP can be deleted from the video signal. This is the result achieved in FIG. 4C. At step 418 in FIG. 4A, the device 100 can determine whether removal of the B frames was sufficient for purposes of producing the desired fast-forward playback speed. If not, then the device 100 can begin to remove P frames from the video, as shown in step 420. As in the case of B frame removal, the P frames that are deleted are preferably distributed throughout the GOP.

Once the proper number of pictures have been deleted, the remaining pictures from the edited GOP's can be consolidated to fill one or more of the GOP's contained in the edited video signal, in accordance with step 422 and as illustrated in FIG. 4C. These pictures can then be recorded onto the storage medium, as shown in step 424 in FIG. 4A. In contrast to the slow motion editing process, the fast-forward edited video can easily fit in its original medium space since one or more pictures have been deleted from the video. In one arrangement, dummy data can then be recorded over the remaining storage medium space, as shown in step 426. This process can prevent the recorder from displaying parts of the original video which still remain on that portion of the storage medium not receiving the edited video. As an example, the stream ID's present in the V_PCK's 41 of the original video located in the remaining space can be modified to instruct the device 100 that this video should be ignored. Once the stream ID's are modified, the video, now considered dummy data, can then be recorded back onto the storage medium in its original location. It should be noted, however, that the invention is not limited to this particular example, as other well known techniques can be used to cause the device 100 to ignore any remaining original video in the original medium space left over by the editing process.

Figure 4D:
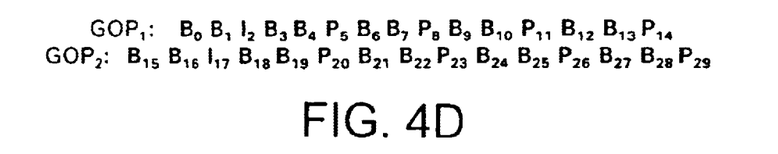
Figure 4E:
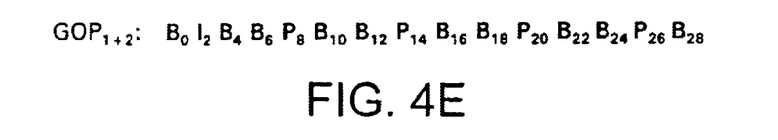

Turning back to step 414, if the edited GOP's are to be reencoded to match the structure of a conventional GOP, then the non-progressive frames in the video can be decoded in accordance with step 415. At step 417, frames can be removed from the video signal being edited. Since the GOP's containing these pictures will be reencoded to match a conventional GOP—an example of which is shown in FIG. 4D—it is irrelevant as to which pictures are deleted from the video signal; however, similar to the previously discussed fast-forward editing process, the nonprogressive frames that are discarded are preferably distributed throughout the GOP for purposes of creating a smoother playback. The number of pictures that are deleted can be based on the desired fast-forward playback speed. FIG. 4E illustrates this process as applied to the two GOP's of FIG. 4D to produce a doubled playback speed. It should be noted, however, that the example shown in FIG. 4E is not intended to limit the invention to this particular deletion sequence, as any other suitable deletion sequence may be used to create the desired playback speed.

Figure 4F:
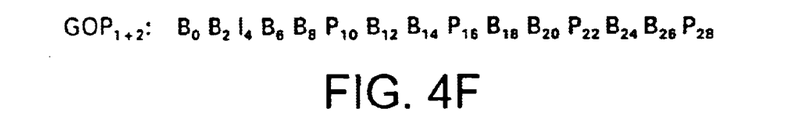

At step 419 of FIG. 4A, the remaining pictures can be consolidated, and these pictures can then be reencoded to match the structure of a conventional GOP containing non-progressive frames, as shown in step 421 of FIG. 4A and FIG. 4F. It should be noted, however, that the example shown in FIG. 4F is not intended to limit the invention to this particular reencoding sequence, as any other suitable reencoding sequence may be used. At step 423, once the pictures have been reencoded, the pictures can be recorded onto the storage medium in the medium space previously occupied by the original video. In addition, dummy data can then be inserted into any remaining storage medium space, as previously described relative to step 426.

Figure 5A:
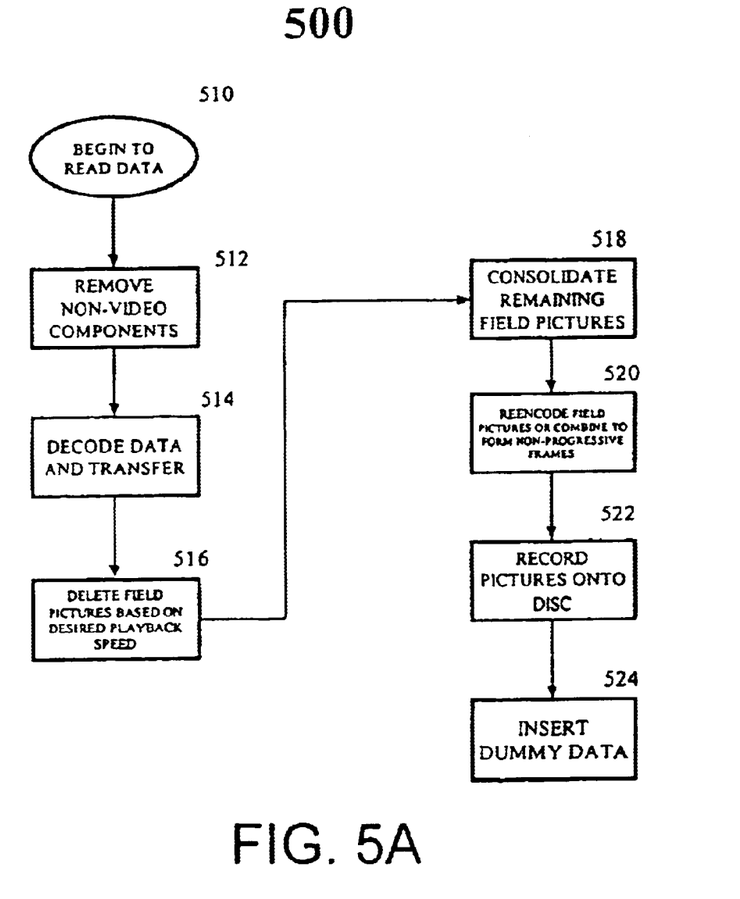
FIG. 5A is a flow chart that illustrates an alternative arrangement to the operation of FIG. 4A for changing the playback speed for video presentation recorded in a non-progressive frame structure format to produce fast motion playback.
Figure 5B:
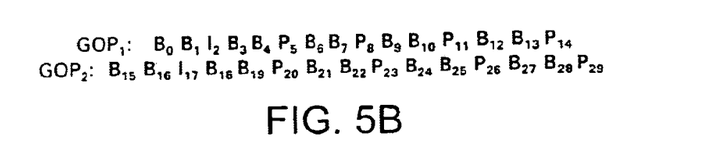
FIGS. 5B–5E demonstrate the editing process of FIG. 5A as applied to two conventional GOP's to produce a doubled playback speed.

FIG. 5A shows a flowchart 500 that illustrates another arrangement in which fast-forwarding editing can be performed on nonprogressive video. FIGS. 5B through 5E illustrate an example of this particular fast motion editing process as applied to two GOP's to create a double speed playback; however, it should be noted that the invention is not limited by this example, as any portion of video may be changed to playback at any speed faster than normal playback according to this particular arrangement. Similar to flowchart 400, in step 510 of FIG. 5A, the device 100 can begin to read data from the medium. In step 512, the demultiplexer 176 of FIG. 1 can separate the video component of the recorded video signal from the non-video components. The non-video components, except for any navigation data, can then be discarded. Next, the pictures that make up the video signal can be decoded by the packet video decoder 178 and can then be transferred to the packet video encoder 144, as shown in step 514. FIG. 5B illustrates the form of two GOP's as they are presented to the video encoder 144.

Figure 5C:
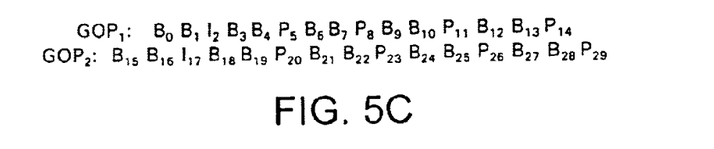

In this arrangement, however, a number of field pictures can be deleted from the video signal based on the desired fast-forward playback speed, as shown in step 516 of FIG. 5A. FIG. 5C illustrates such a process where the desired playback speed is double that of normal playback speed. As pictured, a field picture has been removed from each frame that comprises the video signal. It should be noted, however, that FIG. 5C is merely an example, as any other playback speed can be achieved and any other suitable deletion sequence can be used to achieve a particular speed. Moreover, it is preferable, when applicable, to delete field pictures in a nonsequential manner.

Figure 5D:
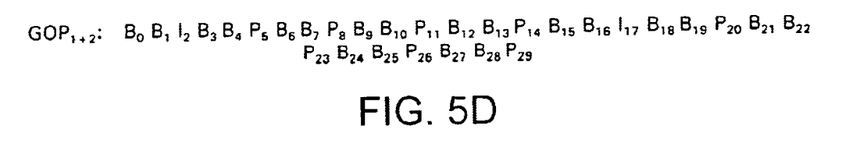
Figure 5E:
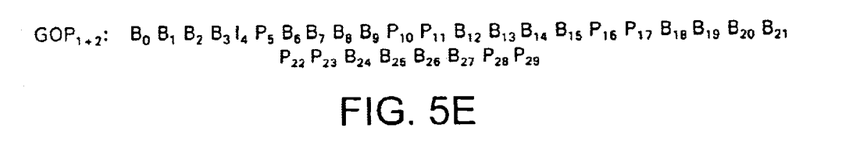

As shown in step 518 of FIG. 5A and FIG. 5D, the remaining field pictures can then be consolidated. At step 520 of FIG. 5A and demonstrated in FIG. 5E, these field pictures can be reencoded to match the structure of a conventional GOP containing field pictures. The field pictures can then be recorded onto the storage medium in the space previously occupied by the original video, as shown in step 522. Similar to the process described in flowchart 400, dummy data can be inserted into any remaining space, as shown in step 524. Although any combination of field pictures may be removed to create the desired playback speed, removing field pictures as illustrated in FIGS. 5B through 5E will produce a smoother playback as well as improved trick mode performance.

We claim:

1. In a rewritable storage medium, a method for changing a playback speed of a selected video segment having a non-progressive frame structure which has been recorded on a portion of said storage medium comprising the steps of:

modifying said selected video segment for a changed playback speed; and recording said modified video segment exclusively on said portion of said medium.

2. The method according to claim 1, further comprising the step of deleting a plurality of non-video packs in said selected video segment to reduce an amount of data contained in said modified video segment.

3. The method according to claim 1, further comprising the step of reducing a resolution of at least one frame contained in said modified video segment.

4. The method according to claim 1, further comprising the step of lowering a bit rate of said modified video segment during said recording step.

5. The method according to claim 1, wherein said video segment is comprised of intra and non-intra frames and said modification comprises the steps of: decoding said intra and non-intra frames;

reencoding said intra and non-intra frames into their associated field pictures; and inserting at least one of the group consisting of dummy field pictures and repeat field pictures into said selected video segment.

6. The method according to claim 5, wherein the number of said dummy field pictures and said repeat field pictures inserted into said selected video segment is based on said changed playback speed.

7. The method according to claim 6, further comprising the step of selectively decoding and reencoding said modified video segment for conventional placement of said dummy field pictures, said repeat field pictures and said associated field pictures.

8. The method according to claim 1, wherein said video segment is comprised of intra and non-intra frames and said modification comprises the step of removing at least one frame from the group consisting of said intra and non-intra frames.

9. The method according to claim 1, wherein said video segment is comprised of intra and non-intra frames and said modification comprises the steps of:

decoding said intra and non-intra frames; and removing at least one field picture from at least one of said intra and non-intra frames.

10. A system for changing a playback speed of a selected video segment having a non-progressive frame structure recorded on a rewritable storage medium, comprising:

storage medium circuitry for selectively reading a video segment which has been recorded on a portion of said rewritable storage medium;

a video processor for modifying said selected video segment for a changed playback speed; and video recording circuitry for recording said modified video segment exclusively on said portion of said storage medium.

11. The system according to claim 10, wherein said video processor deletes a plurality of non-video packs in said selected video segment to reduce an amount of data contained in said modified video segment.

12. The system according to claim 10, wherein said video processor reduces a resolution of at least one frame contained in said modified video segment.

13. The system according to claim 10, wherein said video processor lowers a bit rate of said modified video segment during said recording step.

14. The system according to claim 10, wherein said video segment is comprised of intra and non-intra frames and said video processor:

decodes said intra and non-intra frames;

reencodes said intra and non-intra frames into their associated field pictures; and inserts at least one of the group consisting of dummy field pictures and repeat field pictures into said selected video segment.

15. The system according to claim 14, wherein the number of said dummy field pictures and said repeat field pictures inserted into said selected video segment is based on said changed playback speed.

16. The system according to claim 15, wherein said video processor selectively decodes and reencodes said modified video segment for conventional placement of said dummy field pictures, said repeat field pictures and said associated field pictures.

17. The system according to claim 10, wherein said video segment is comprised of intra and non-intra frames and said video processor removes at least one frame from the group consisting of said intra and non-intra frames.

18. The system according to claim 10, wherein said video segment is comprised of intra and non-intra frames and said video processor:

decodes said intra and non-intra frames; and removes at least one field picture from at least one of said intra and non-intra frames.

* * * * *